United States Patent [19]

Pfarrwaller et al.

[11] Patent Number: 5,205,377
[45] Date of Patent: Apr. 27, 1993

[54] METHOD OF AND DEVICE FOR TIMED LUBRICATION BY MEANS OF A LUBRICANT MIST

[75] Inventors: Erwin Pfarrwaller, Winterthur; Rudolf Lehn, Bülach, both of Switzerland

[73] Assignee: Sulzer Brothers Limited, Winterthur, Switzerland

[21] Appl. No.: 843,883

[22] Filed: Feb. 28, 1992

[30] Foreign Application Priority Data

May 3, 1991 [CH] Switzerland ............ 661/91

[51] Int. Cl.⁵ .............................................. F01M 1/08
[52] U.S. Cl. .................................. 184/6.26; 184/7.4; 184/55.1; 417/76
[58] Field of Search ................. 184/6.1, 6.26, 6.16, 184/7.4, 7.3, 7.2, 55.1, 55.2; 417/76

[56] References Cited

U.S. PATENT DOCUMENTS

| | | | |
|---|---|---|---|
| 1,919,118 | 7/1933 | Millington | 184/7.2 |
| 2,691,428 | 10/1954 | Thomas | 184/6.26 |
| 3,685,617 | 8/1972 | Gardner | 184/6.16 |
| 4,359,141 | 11/1982 | Schnell | 184/6.26 |
| 4,391,573 | 7/1983 | Tanaka et al. | 184/6.16 |
| 4,472,121 | 9/1984 | Tanaka et al. | 184/6.16 |
| 4,626,180 | 12/1986 | Tagawa et al. | 184/6.16 |
| 4,653,610 | 3/1987 | Tamura | 184/6.12 |
| 5,064,456 | 11/1991 | Gantzer | 184/6.26 |

FOREIGN PATENT DOCUMENTS 947275 7/1956 Fed. Rep. of Germany .
3131699 4/1983 Fed. Rep. of Germany .
620253 11/1980 Switzerland .

*Primary Examiner*—Ira S. Lazarus
*Assistant Examiner*—Alan B. Cariaso
*Attorney, Agent, or Firm*—Townsend and Townsend, Khourie and Crew

[57] ABSTRACT

The lubricant mist is supplied in timed fashion to at least one nozzle (31, 36, 40, 45) associated with a lubrication station in the zone of movement of a moving part (32, 37, 41 and 34 respectively). The timed supply of the mist is effected in dependence upon the position of a drive shaft from which the moving part derives its movement. The lubricant mist can therefore be supplied to the lubrication station in an accurately dosed quantity only when it is needed there. A possible use of the lubricating method is for looms where it is particularly important that the web of cloth produced on the loom should not be soiled by lubricant.

11 Claims, 1 Drawing Sheet

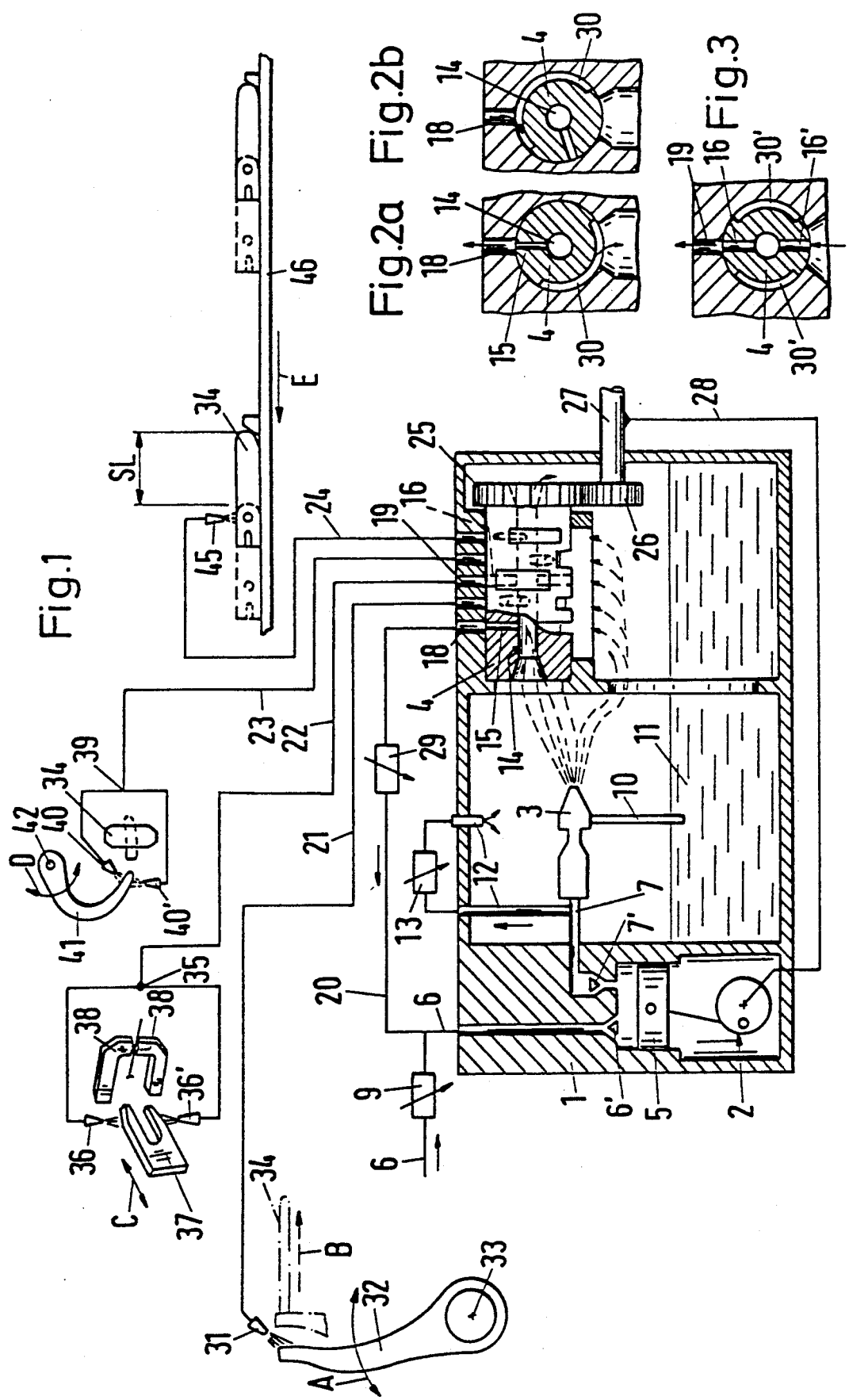

5,205,377

METHOD OF AND DEVICE FOR TIMED LUBRICATION BY MEANS OF A LUBRICANT MIST

BACKGROUND OF THE INVENTION

The invention relates to a method of lubricating at least one moving part of a machine, such part having at least one rubbing surface to be lubricated, the machine having a drive shaft to move the moving part, by means of a lubricant which a misting device breaks up into fine droplets and which is distributed in a gaseous medium, then supplied as a mist in timed fashion to at least one nozzle associated with a lubrication station near the moving part, more particularly for looms. The invention also relates to a device for the practice of the method.

CH-PS 620 253 discloses a method end device of this kind for use in a loom. The device has a compressor which is disposed in piping and which is adapted to compress the gaseous medium, a reservoir for storing the compressed medium, a water separator and a pressure monitor. Downstream thereof the piping splits up into two branches, each branch having a solenoid valve and one of the two branches having a mist generator. After the mist generator as considered in the flow direction the two branches recombine to form a common line to which nozzles associated with the lubrication stations are connected. The two solenoid valves are controlled by an electronic program controller which is synchronised with the loom by a speed-dependent sensor actuated by the loom main shaft. Consequently, in the known method the valves are so operated in dependence upon time by the electronic program controller that lubricant mist is supplied in timed fashion to the nozzles associated with the lubrication stations and pure air is supplied between the lubrication phases or periods, such air being blown on to the lubrication stations. It is possible in this connection for lubricant mist to be supplied to the lubrication stations, for example, during a single revolution of the main shaft and for no lubricant mist to be thus supplied during the next two or three main shaft revolutions. This means that the lubricant is supplied in excess during the single revolution to ensure that lubricant is still available at the lubrication stations during the subsequent two or three revolutions. Also, the lubricating system has the disadvantage of being very elaborate because of the solenoid valves and the electronic program controller.

SUMMARY OF THE INVENTION

It is the object of the invention so to improve the lubricating method of the kind hereinbefore set out that the lubrication station is supplied with the lubricant mist in an accurately dosed quantity only when such mist is needed at such station. It is the object of the invention so to improve the lubricating device that the same is embodied mainly just by mechanically driven components, so that its construction is simplified and it is less likely to malfunction.

According to the invention, therefore, the timed supply of the lubricant mist is effected in dependence upon the position of the drive shaft. Consequently, a lubrication station can be supplied with lubricant mist at the cadence of the machine only when the moving part is in an appropriate position for this step. There are two possibilities in this connection, as follows:

(a) lubricant mist is supplied when and for as long as the rubbing or sliding surface of the moving part is near the associated stationary nozzle, or (b) lubricant mist is supplied to the stationary companion surface engaged by the rubbing surface of the moving part when the same is not disposed between such companion surface and the nozzle.

This enables the supply of lubricant mist during each lubrication phase to be minimised.

In the device for the practice of the method according to the invention, a distributor which is mounted in a casing and which rotates in dependence upon the machine drive shaft is provided between the mist generator and the nozzle, has a duct extending longitudinally inside the distributor and has at least one duct which branches off the first-mentioned duct and extends to the generated surface of the distributor, the branching duct communicating with an aperture in the casing, the nozzle being connected to such aperture by way of a connecting line.

In this device the rotating distributor replaces the solenoid valves and electronic program controller of the known device and so the device according to the invention is of much simpler construction than the known device. Also, in the novel device there is no line conveying air to the lubrication stations between the lubrication phases. The novel device is therefore less likely to malfunction. The duct extending to the generated surface of the distributor is dimensioned specifically for the lubricant consumption of the lubrication station it supplies, so that no subsequent adjustments of the duct are necessary.

A very compact construction results if the mist generator is disposed in the casing. Compactness is enhanced by placing a pump for compressing the gaseous medium in the casing.

Further, when the distributor is formed, in the plane in which there is a radial duct, with a groove which extends peripherally of the distributor and which does not communicate with the last-mentioned duct, the advantage is provided that liquid lubricant deposited from the mist on the wall of the pipes connected to the casing is returned thereto by way of the peripheral grooves in the phases between the lubrication phases.

If, in addition to radial ducts, the distributor has other ducts which guide oil mist from the chamber above the lubricant-collecting chamber to the duct which extends lengthwise of the distributor, the radial ducts which are at the front as considered in the direction of mist flow do not receive a mist with a higher lubricant content than the radial ducts further behind.

Finally, the conically widening duct ends boost the return to the casing of liquid lubricant deposited in the duct.

BRIEF DESCRIPTION OF THE DRAWINGS

An embodiment of the invention will be described in greater detail hereinafter with reference to the drawings wherein:

FIG. 1 is a view in a diagrammatically simplified section of a lubricating device supplying five different lubrication stations;

FIGS. 2a and 2b are each the same section through the distributor but in different positions thereof, and FIG. 3 is a cross-section through the distributor at a different place from the place shown in FIGS. 2a and 2b.

DETAILED DESCRIPTION OF THE PREFERRED EMBODIMENTS

Referring to FIG. 1, the lubricating device has a casing 1 receiving an air pump 2, a mist generator 3 and a distributor 4. Pump 2 is a crank-driven reciprocating pump whose piston 5 intake air through a line 6 on its descent and on its ascent delivers the air through a line 7 to the mist generator 3 at a pressure between 80 and 160 mbar. The quantity of air intaken by the pump 2 can be adjusted by means of an intake restrictor 9 which, unlike what is shown in FIG. 1, is incorporated in the casing 1. Valves 6', 7' shown diagrammatically in FIG. 1 in the line 6, 7 respectively are spring-loaded ball valves.

A pipe 10 dips down from the generator 3 into a lubricating oil bath 11 in the bottom part of the casing 1. The air delivered by the pump 2 flows through the ejector-like generator 3 end, as it does so, sucks in lubricating oil through the pipe 10; the latter oil breaks up into fine droplets upon issuing from the nozzle-like exit of the generator 3 and is finely divided in the air flow. To vary the proportion of droplets in the air, a bypass line 12 is connected to the line 7—i.e., the bypass 12 diverts some of the air delivered by the pump 2 from the generator 3. Disposed in the bypass 12 is a restrictor 13 which like the restrictor 9 is incorporated in the casing 1.

The roller-like rotating distributor 4 is mounted in the casing 1 to the right of the generator 3 in FIG. 1 and is formed with a continuous central bore 14 which widens conically at both ends. Radial bores 15, 16 to the number of lubrication stations branch off the bore 14. The radial bores 15, 16 correspond with a respective bore 18, 19 in the top of the casing 1 and lines 20-24 extending to the various lubrication stations are connected one each to the bores 18, 19. On the side opposite the bores 18, 19 the casing 1 is open towards the oil bath 11.

The right-hand end of the distributor 4 in FIG. 1 has a toothed ring 25 engaging a pinion 26 driven at a predetermined speed by way of a shaft 27 which can be the drive shaft of the machine (not shown). The speed depends upon the intended use of the lubricating device and, in the case of the embodiment shown, where lubrication stations of a projectile loom are supplied, is half the speed of the loom drive shaft. The drive for the pump 2 is derived from the shaft 27, as indicated by a line 28.

As FIGS. 2a and b show more clearly than FIG. 1, the distributor 4 is formed with a groove 30 in the plane in which the radial bore 15 extends, the groove 30 extending approximately over three-quarters of the periphery of the distributor but not communicating with the bore 15. The function of the groove 30 is to return to the oil bath 11 oil which has precipitated in the bore 18 and in the line connected thereto.

In the arrangement shown in FIG. 3, a further bore 16' is provided in registration with the radial bore 16 and serves to double the lubricating cadence—i.e., to supply oil mist to the lubrication station connected to the bore 19 twice per revolution of the distributor 4. Another function of the additional bore 16' is to supply the bore 16 with additional oil mist from the chamber above the oil bath 11 in addition to the oil mist supplied by way of the central bore 14. The radial bore 16 fulfills the same purpose when it has been turned through 180° from the position shown in FIG. 3 and is at the bottom so that the bore 16' then communicates with the bore 19. Since two radial bores are therefore disposed in the same plane, in the example of FIG. 3 there are two peripheral grooves 30' in the distributor 4, each such groove extending over a good quarter of the distributor periphery. In the examples shown in FIGS. 2 and 3 there are peripheral grooves in the planes of the other radial bores of the distributor 4. The distributor 4 can be formed with additional cross-bores (similar to the bore 16') which supply the mist to the associated radial bore 15 or 16 without the additional bores communicating with the bores 18 or 19 when they are in their top position.

Referring to FIG. 1, the line 20 extends into the pump intake line 6 so that the pump also receives a timed supply of lubricating oil mist for lubricating the intake valve 6' and the piston 5. A restrictor 29 for dosing the quantity of oil mist is disposed in the line 20.

The line 21 extends to a nozzle 31 directed towards the contact surface of a striker 32 which is pivotable around an axis 33, in the manner indicated by a double arrow A, and which when it pivots to the right picks a projectile 34 (shown in chain dotted lines) into the shed (not shown) of the loom, as indicated by an arrow B. During picking the contact surface of the striker 32 contacts the projectile 34. Consequently, when the striker 32 is in the solid-line position of FIG. 1 a mist pulse is supplied through the nozzle 31 to the contact surface.

The line 22 divides at a place 35 and extends to two nozzles 36, 36' each directed towards a rubbing surface of a retractor and gripper opener 37 which reciprocates rectilinearly in the direction indicated by a double arrow C and which, when it moves to the right in FIG. 1, engages between the prongs 38 of the yarn retractor and opens the same. The two rubbing surfaces of the gripper opener 37 are supplied with a pulse of oil mist whenever the gripper opener is in the withdrawn position illustrated. Since the line 22 cooperates with that part of the distributor 4 where the same has two radial bores 16, 16' (FIG. 3), the rubbing surfaces of the opener 37 receive a pulse of oil mist twice per revolution of the distributor 4.

The line 23 also divides at a place 39 and extends to two nozzles 40, 40' each directed towards a rubbing surface of a projectile gripper opener 41 pivotable around a pivot 42 in the manner indicated by a double arrow D. When the opener 41 is in the pivoted-out position shown in FIG. 1, its two rubbing surfaces receive a pulse of oil mist from the associated nozzles 40, 40'. The position in which the opener 41 has opened the projectile 34 is shown in chain-dotted lines.

The line 24 extends to a nozzle 45 disposed above the conveyor 46 for returning the projectiles which have left the shed to the picking mechanism (not shown). During this conveyance the rubbing surface of each projectile 34 is lubricated with oil mist through the agency of the nozzle 45, this lubrication occurring during the length SL. The same is shorter than the length of the complete projectile in order to ensure that the gripper part of the projectile, such part being at the front as considered in the direction of the arrow E, is not supplied with oil mist. This part of the gripper subsequently engages the yarn to be picked into the shed and every effort should be made to keep oil away from the yarn.

The position of the radial ducts 15, 16 in the distributor 4 in association with the bores 18, 19 respectively communicating with them determines the start of mist feeding to the corresponding lubrication stations in dependence upon the position of the drive shaft 27. The duration of mist feeding depends upon the cross-sectional dimensions of the bores 15, 16. If the duration is required to be longer than in the example shown, the exits of the ducts 15, 16 in the generated surface of the distributor 4 are enlarged by widening the exit in the peripheral direction of the distributor so that grooves may arise there. In such a case the grooves 30, 30' should be correspondingly shortened to ensure that there is no communication with the widened bore.

As a variant of the embodiment shown, the oil bath 11 can be so disposed in the casing relatively to the mist generator 3 that the oil is supplied directly to the generator ejector. In this case, therefore, no intake pipe 10 is necessary. In another variant conveying means, such as a gear pump, can be provided at the bottom end of the pipe 10 to supply the oil to the mist generator, for example, a gear pump. The drive for the latter pump can, like the drive for the air pump 2, be derived from the drive shaft 27.

We claim:

1. A method of lubricating at least one movable part of a machine, said part having at least one rubbing surface to be lubricated, the maching having a drive shaft for moving the movable part, the method comprising the steps of dispersing a lubricant into fine droplets and distributing the droplets in a gaseous medium to form a lubricant mist, supplying the mist in timed fashion to at least one nozzle associated with a lubrication station near the movable part, and interrupting the supply of the lubricant mist in dependence upon the relative position of the drive shaft.

2. A device for intermittently lubricating a surface of a machine including a drive shaft with a lubricant mist of lubricant droplets dispersed in a gaseous medium, the device comprising a casing, a distributor mounted in the casing and rotatable relative to the casing in dependence upon the drive shaft, a mist generator for dispersing the lubricant, a nozzle for discharging the mist toward the surface, the distributor being disposed between the mist generator and the nozzle, a first duct extending longitudinally inside the distributor, and at least one second duct which branches off the first duct and extends to a periphery of the distributor, the second duct communicating with an aperture in the casing, and a line connecting the nozzle with the aperture for flowing the mist to the nozzle.

3. A device according to claim 2, wherein the casing has a lubricant-collecting chamber located in a bottom part of the casing an below the distributor and in addition houses the mist generator, the mist generator having an intake pipe which dips into the lubricant in the collecting chamber.

4. A device according to claim 2, including a pump located in the caswing for compressing the gaseous medium, and a common drive for activating the pump and the distributor.

5. A device according to claim 3, wherein the casing is open towards the lubricant-collecting chamber in the vicinity of the distributor, and wherein the distributor includes a groove in the plane of the second duct extending peripherally of the distributor and not in flow communication with the second duct.

6. A device according to claim 2, including a plurality of second ducts which branch off the first duct, wherein the casing is open towards a lubricant-collecting chamber in the vicinity of the distributor, and wherein the distributor, in addition to the second ducts, includes additional ducts which guide oil mist from above the lubricant-collecting chamber to the first duct.

7. A device according to claim 4, including an intake restrictor disposed at an intake side of the pump for the gaseous medium.

8. A device according to claim 2, wherein the mist generator includes a bypass line for flowing the lubricant into the casing independently of the mist generator and a quantity-adjusting element disposed in the bypass line.

9. A device according to claim 2, including an air pump and a conduit connected to the distributor and in fluid communication with an air intake line of the pump.

10. A device according to claim 2, wherein the first duct has an inflow end and an other end remote therefrom, and wherein both ends of the first duct widen conically.

11. A device for lubricating a movable part of a machine, the device comprising a stationary casing defining a lubricant reservoir portion at the bottom of the casing and an atomizing chamber above the lubricant reservoir portion; means including a mist generator for dispersing the lubricant in fine droplets in a gaseous medium in the atomizing chamber to thereby form a lubricant mist; a distributor rotatably mounted in the chamber and operatively coupled with a drive shaft for rotation therewith, the distributor including a central bore having at least one open end communicating with the atomizing chamber so that the lubricant mist can flow into the bore, the distributor further including at least one radially oriented bore communicating with the central bore and a periphery of the distributor; flow means carried by the casing for establishing fluid communication between an exterior of the casing and the at least one radial bore when the latter is at a predetermined angular position so that, while in said angular position, lubricant mist can flow through the longitudinal bore, the at least one radial bore and through the said flow means to the exterior of the casing; and a lubricant mist dispersing nozzle in fluid communication with said flow means so that the nozzle receives intermittent pulses of the lubricant mist for application to said movable part as a function of the relative angular position of the drive shaft and, therewith, of the rotatable distributor.

* * * * *